United States Patent [19]
Kenny et al.

[11] Patent Number: 4,902,977
[45] Date of Patent: Feb. 20, 1990

[54] MULTIPACTOR PRESSURE GAUGE FOR USE AS A NONINVASIVE VACUUM TUBE SENSOR

[75] Inventors: Michael B. Kenny, Sunnyvale, Calif.; Larry R. Barnett, Bailey, Colo.; Richard W. Grow, Salt Lake City; J. Mark Baird, Sandy, both of Utah

[73] Assignee: University of Utah, Salt Lake City, Utah

[21] Appl. No.: 295,720

[22] Filed: Jan. 10, 1989

[51] Int. Cl.$^4$ .................. G01L 21/32; G01N 21/62
[52] U.S. Cl. .................. 324/462; 324/460; 324/470; 328/243
[58] Field of Search .................. 313/103 R; 328/242, 328/243, 256; 324/460, 462, 470

[56] References Cited
U.S. PATENT DOCUMENTS

| 2,071,515 | 2/1937 | Farnsworth | 328/243 |
| 2,071,517 | 2/1937 | Farnsworth | 328/243 |
| 2,884,550 | 4/1959 | Lafferty | 324/462 |
| 3,521,146 | 7/1970 | Forrer | 328/243 |
| 3,527,939 | 9/1970 | Dawson | 324/462 |

Primary Examiner—Reinhard J. Eisenzopf
Assistant Examiner—Jose M. Solis
Attorney, Agent, or Firm—K. S. Cornaby

[57] ABSTRACT

A gas ionization type vacuum gauge for testing the internal vacuum levels to below $10^{-6}$ torr is disclosed which uses a multipactor discharge means as the source for the electron current used to ionize residual gas molecules. The invention comprises an RF field enhancing cavity which can be constructed of high-vacuum-compatible materials, able to withstand bake-out microwave temperatures and a negatively biased ion collection wave, wire, or grid. A simple ceramic RF feed-through permits simple and noninvasive pressure measurements. The device can be made much smaller than conventional gauges.

6 Claims, 1 Drawing Sheet

MULTIPACTOR PRESSURE GAUGE FOR USE AS A NONINVASIVE VACUUM TUBE SENSOR

BACKGROUND OF THE INVENTION

This invention relates to the measurement of vacuum pressure levels and is especially useful for the purpose of determining the vacuum integrity of microwave vacuum tubes and other compact devices. Many microwave tube failures result from degradation of vacuum levels within the tube. Frequently, tubes remain on storage shelves for months or years, losing vacuum integrity during that time. Much time and expense may be expended in installing a microwave tube only to discover that the tube is not viable. This invention provides a method by which vacuum tubes can be tested prior to their installation. This invention also provides a small vacuum gauge for general vacuum testing.

Techniques exist for the measurement of vacuum levels which operate on the basic principles of collection of ionized residual gas molecules or the cooling of a hot filament placed within the vacuum tube. Examples of vacuum gauges using either of these two methods are mass spectrometers, Bayard-Alpert gauges, hot cathodes ionization gauges, Penning or Philips gauge, Schulz-Phelps gauges, or Pirani gauges.

The existing gauges utilizing the method of collection of ionized residual gas molecules are particularly valuable for the sensitivity which they afford in use. However, some sensitivity is lost with miniaturization of the gauge which necessarily reduces the electron path length associated with such gauges. Gauges utilizing the method of cooling of a hot filament by residual gas molecules are simple in design and are easily miniaturized. However, such gauges are not highly sensitive, and likely to further lose sensitivity with miniaturization.

Usual gas ionization vacuum gauges use a hot or cold cathode to emit an electron current. Ionization of residual gas molecules occurs by collision with electrons flowing along the current path to a collector. The chance that an electron will ionize a gas molecule at pressures of $10^{-6}$ torr or lower, the pressure at which failure of the vacuum begins, is small. Accordingly, a decrease in the electron path length in miniaturization will reduce the probability of ionization. As a result, small volume gauges must produce a significantly higher electron current in order to produce a significant ion current.

The invention herein overcomes the attendant problems associated with currently available gauges, as discussed above. The present invention employs a multipactor discharge as the electron current source which allows high electron current densities in a miniaturized gauge.

SUMMARY OF THE INVENTION

The present invention comprises a cavity resonator, particularly of the re-entrant type. The vacuum sensor is roughly cylindrical in shape with a post at either end of the cylinder. The posts are of metal and can have a thin oxide or ceramic or other type material coating for secondary emission enhancement. The gap formed between the posts is highly capacitive allowing for very large electric field strengths to be achieved across the gap. Small devices are achievable under the design as described in further detail below.

A cavity resonator is optimal to vacuum gauge use because the cavities can be operated at frequencies well into the gigahertz range, high field strengths can be achieved at resonance frequencies, the two parallel surfaces necessary for multipactor are inherent to the design, and large amounts of power can be coupled to these structures.

The cavity resonator is made form a material compatible with the type of tube being tested. For example, copper could be the material of choice for use with microwave vacuum tubes.

A multipactor discharge is used as the electron current source. Multipactor is a resonant condition where an electron moving between two electrodes with oscillating potentials will span the electrode gap in one-half cycle of the electrode drive frequency. When the secondary electron emission ratio is equal to or greater than 1, the number of electrons involved in the multipactor interaction builds to a steady-state current. The current take the form of a thin sheet of charge oscillating between the electrodes. The achievement of multipactor depends upon many factors which are discussed below.

The surface of the multipactor electrodes is covered with a thin layer of an oxide, such as aluminum oxide, to improve secondary emission characteristics. The ions are collected by single or multiple negatively biased wire(s) (or a grid) disposed between, but not in contact with, the cavity posts. The experimental gauge built at the University of Utah has a cavity with a resonant frequency of 9.39 gigahertz and is operated with 60 to 10,000 watts of peak pulsed radio-frequency RF power, 6 to 10 mW average RF power. An ion collection wire bias of approximately $-100$ volts is used to operate the gauge at high vacuums. A multipactor discharge provides a steady, invariant electron current at pressures below 1 torr. At pressures above 1 torr, variation may be seen.

The vacuum is determined by measuring the ion pulse height on an oscilliscope. Optimum measurement of the vacuum is made by measuring the pulse height 1 microsecond after the RF pulse has ended. The apparatus is capable of measuring vacuum pressures from 1 torr to at least $10^{-6}$ torr or below. At lower pressures, the best results are achieved by using a high input power which results in more ionization due to a higher electron current.

One advantage of the present invention over existing vacuum gauge devices is that cold cathodes may be used. Further, high electron current densities are possible. Also, the simple design and use of the multipactor discharge allows for very small structure.

BRIEF DESCRIPTION OF THE DRAWING

The preferred application of the invention is illustrated by the following drawing.

DETAILED DESCRIPTION OF THE DRAWING

Figure 1:
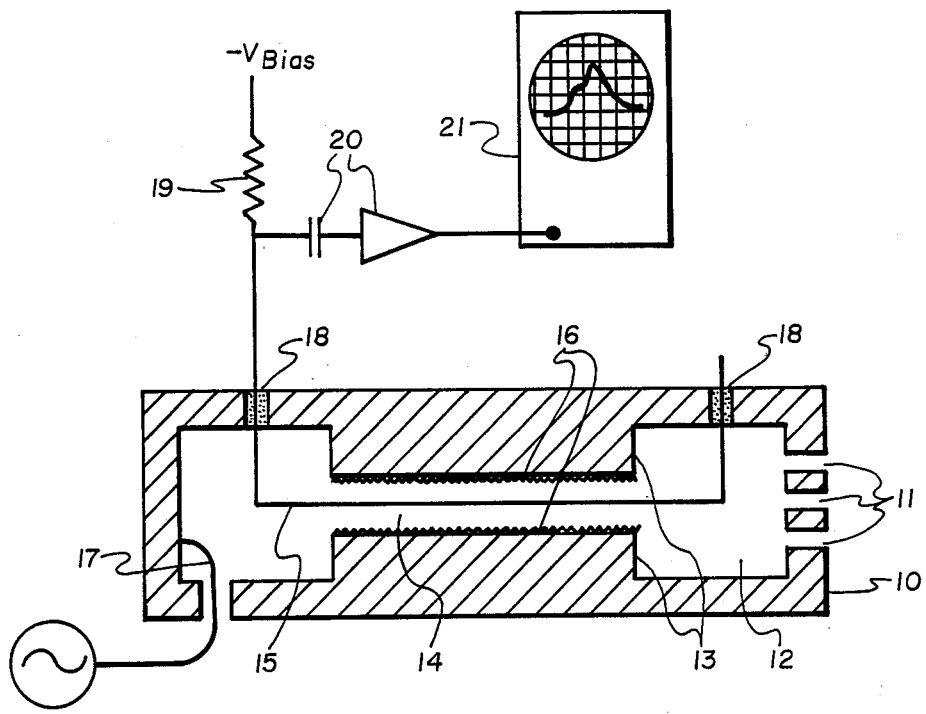
FIG. 1 is a perspective view of the multipactor pressure gauge.

FIG. 1 shows a perspective view of the multipactor pressure gauge, in which the gauge 10 is adapted to be placed in a vacuum and has a plurality of vacuum pressure equalization ports 11 connecting to a cylindrically shaped re-entrant cavity resonator 12. Within said cavity resonator 12 are a pair of capacitive posts 13 and a multipactor discharge region 14 between posts 13.

Extending the length of discharge region 14 is a negatively biased wire(s) or grid 15 to collect ions. Post 13 surfaces in the discharge region 14 may have an optional coating 16 to enhance secondary emission. The gauge also has a cavity excitation loop 17 connected to an RF source. The support wire grid 15 has insulated feed-throughs 18 to support the grid 15.

The grid 15 is connected to a high impedance bias resistor 19, a capacitively coupled operational amplifier 20, and an oscilloscope for measuring ion pulse current.

DETAILED DESCRIPTION OF THE INVENTION

Analysis of Multipactor Gauge

Multipactor is a resonant condition where an oscillating electric field of sufficient magnitude is applied across two suitably spaced parallel plane surfaces with secondary emission capability. Stray electrons, which are always present, impact the surfaces, some with sufficient energy to liberate secondary electrons. Secondary electrons are those which are produced by bombardment of a solid material with primary electrons resulting in the liberation of electrons from the solid through its surface. As the electric field reverses, the electrons are drawn toward the opposite surface where more secondary electrons are liberated. These electrons, in proper phase, produce a saturated steady-state condition of resonance in which all electrons in the proper phase are focused into a tightly bunched oscillating sheet of finite thickness. The sheet moves back and forth between the opposing surfaces at the frequency of the drive source.

The sheet of electrons thus produced is the electron current source used to ionize residual gas molecules present in the vacuum. It is these ions which are to be collected and measured to determine the vacuum pressure.

The following analysis of multipactor is based on two initial assumptions: First, that there is no magnetic field present, and secondly, space-charge effects are ignored.

In the absence of magnetic fields, the force on an electron, given by the Lorentz equation, is $$\vec{F} = e\vec{E} \tag{1}$$

where e is the charge on an electron and $\vec{E}$ is the electric field between the surfaces. The electric field between two parallel surfaces with sinusoidally oscillating potentials is $$E = \frac{V_{RF}}{d} \sin(\omega t + \alpha) \tag{2}$$

where $V_{RF}$ is the peak RF voltage of the surfaces, d is the distance between the surfaces, $\omega$ the frequency at which the potentials of the surfaces are being driven, and $\alpha$ is the phase of the electron with respect to the electric field when the electron has left one surface. Substituting Eq. 2 into Eq. 1, the force on an electron becomes $$F = \frac{eV_{RF}}{d} \sin(\omega t + \alpha) \tag{3}$$

From Newton's second law, the force on a particle is also given by the product of its mass and acceleration; therefore, Eq. 3 becomes $$m \frac{d^2y}{dt^2} = \frac{eV_{RF}}{d} \sin(\omega t + \alpha) \tag{4}$$

The acceleration of the electron from one surface to the next is found by dividing Eq. 4 by m, the mass of an electron.

$$\frac{d^2y}{dt^2} = \frac{eV_{RF}}{md} \sin(\omega t + \alpha) \tag{5}$$

Integrating Eq. 5 with respect to the time t gives the velocity of the electron at time t.

$$\frac{dy}{dt} = -\frac{eV_{RF}}{md\omega} \cos(\omega t + \alpha) + C_1 \tag{6}$$

At t=0, the electron is at surface A. The velocity of the electron at t=0 is the secondary emission velocity of the material. Using these initial conditions to solve for the constant of integration $C_1$ yields $$v_{2nd} = -\frac{eV_{RF}}{md\omega} \cos(\alpha) + C_1 \tag{7}$$

$$C_1 = v_{2nd} + \frac{eV_{RF}}{md\omega} \cos(\alpha) \tag{8}$$

The secondary electron emission velocity $V_{2nd}$ can be written in terms of a secondary electron emission voltage by the kinetic energy relation.

$$\frac{1}{2} mv_{2nd}^2 = eV_{2nd} \tag{9}$$

$$v_{2nd} = \sqrt{\frac{2eV_{2nd}}{m}} \tag{10}$$

Substitute Eq. 10 into Eq. 8 to obtain $$C_1 = \sqrt{\frac{2eV_{2nd}}{m}} + \frac{eV_{RF}}{md\omega} \cos(\alpha) \tag{11}$$

Substitute this value for $C_1$ int Eq. 6 to obtain $$\frac{dy}{dt} = \frac{eV_{RF}}{md\omega} [\cos(\alpha) - \cos(\omega t + \alpha)] + \sqrt{\frac{2eV_{2nd}}{m}} \tag{12}$$

Integration of Eq. 12 gives the position of the electron at time t, $$Y = \frac{eV_{RF}}{md\omega} \left[ t \cos(\alpha) - \frac{1}{\omega} \sin(\omega t + \alpha) \right] + \sqrt{\frac{2eV_{2nd}}{m}} t + C_2 \tag{13}$$

The initial conditions for the position of the electron are, at y=0, t=0. Using these initial conditions to solve for C2 yields $$0 = \frac{eV_{RF}}{md\omega} \left[ -\frac{1}{\omega} \sin(\alpha) \right] + C_2 \tag{14}$$

-continued $$C_2 = \frac{eV_{RF}}{md\omega^2} \sin(\alpha) \tag{15}$$

Substitute Eq. 15 into Eq. 13 to obtain $$Y = \frac{eV_{RF}}{md\omega^2} [\omega t \cos(\alpha) - \sin(\omega t + \alpha) + \sin(\alpha)] + \sqrt{\frac{2eV_{2nd}}{m}} \, t \tag{16}$$

In order for multipactor to build up, the resonant condition of the system must be satisfied. The resonant condition is $y=d$ at $t=\pi/\omega$. This occurs when the electron travels from $y=0$ to $y=d$ in exactly one-half cycle of the drive frequency. Applying this condition to Eq. 16 gives $$d = \frac{eV_{RF}}{md\omega^2} [\pi \cos(\alpha) - \sin(\pi + \alpha) + \sin(\alpha)] + \sqrt{\frac{2eV_{2nd}}{m}} \frac{\pi}{\omega} \tag{17}$$

$$d = \frac{eV_{RF}}{md\omega^2} [\pi \cos(\alpha) + 2 \sin(\alpha)] + \sqrt{\frac{2eV_{2nd}}{m}} \frac{\pi}{\omega} \tag{18}$$

Solving Eq. 18 for $V_{RF}$ gives $$V_{RF} = \left(d - \sqrt{\frac{2eV_{2nd}}{m}} \frac{\pi}{\omega}\right) \frac{md\omega^2}{e(\pi \cos\alpha + 2 \sin\alpha)} \tag{19}$$

Equation 19 shows that the $V_{RF}$ necessary for multipactor is determined from $\omega$, d, $\alpha$, and $V_{2nd}$. The phase of the electron, $\alpha$, gives a range of RF voltages over which multipactor can occur.

To determine the phase that gives the minimum RF voltage necessary to achieve multipactor, notice from Eq. 19, that $V_{RF}$ is at a minimum value when the term $[\pi \cos(\alpha) + 2 \sin(\alpha)]$ is at a maximum. Differentiating this term with respect to $\alpha$ and setting the result equal to 0 yields $$-\pi \sin(\alpha) + 2 \cos(\alpha) = 0 \tag{20}$$

Solving Eq. 20 for $\alpha$ gives $$\alpha = 0.567 \text{ radians} = 32.5° \tag{21}$$

for minimum $V_{RF}$. This means that for the minimum $V_{RF}$ necessary for multipactor, an electron will lag the electric field by 32.5°. Increasing the RF voltage from this point will decrease the phase lag of the electron.

The voltage of the electron when it strikes a surface is called the impact voltage of the electron. For multipactor buildup to occur, this impact voltage must be between the first and second crossovers of the surface material being used. To determine the impact voltage, start with Eq. 12. Set $t=\pi/\omega$ to obtain $dy/dt$ at surface B.

$$\frac{dy}{dt_{(at \; surface \; B)}} = \frac{eV_{RF}}{md\omega} [\cos(\alpha) - \cos(\pi + \alpha)] + \tag{22}$$

$$\frac{dy}{dt_{(at \; surface \; B)}} = \frac{2eV_{RF}}{md\omega} \cos(\alpha) + \sqrt{\frac{2eV_{2nd}}{m}} \tag{23}$$

To convert this velocity to a voltage, use the relation $V = m/2e \; v^2$ to obtain the impact voltage, $V_i$.

$$V_i = \frac{2e}{m} \left(\frac{V_{RF}}{d\omega} \cos(\alpha) + \sqrt{\frac{mV_{2nd}}{2e}}\right)^2 \tag{24}$$

The maximum electron current obtainable in a multipactor discharge is limited by space-charge effects on the electron sheet. As the electron current builds, space charge of the current sheet tends to thicken the sheet about the optimal electron phase for the pacticular RF voltage. The sheet thickening is balanced by the phase focusing effect tightening the sheet. Electrons on the edges of the sheet will be forced out from between the surfaces by the space-charge electric field.

An estimate of the maximum space-charge density per unit area of the current sheet has been determined by Forrer and Milazzo. Their estimate was determined by calculating the perveance of the gap between the surfaces.

$$\sigma_{max} = \frac{0.1 \; \epsilon_0 m d \omega^2}{e} \; c/m^2 \tag{25}$$

The maximum electron current density is obtained from the maximum space-charge density by the realization that the amount of charge in Eq. 25 is delivered to a surface every $\pi/w$ seconds. Dividing Eq. 25 by $\pi/w$ seconds gives an estimate of the maximum average current density of a multipactor discharge.

$$J_{max \; (average)} = \frac{0.1 \; \epsilon_0 m \omega^3}{e \pi} \tag{26}$$

The maximum average power dissipated at the surfaces due to the multipactor current discharge is determined by multiplying the maximum average current by the impact voltage.

$$P_{max \; (average)} = J_{max(average)} \; V_i \tag{27}$$

Equation 27 gives the drive power level needed to sustain multipactor at saturation.

A suitable structure to provide the surfaces and field strengths necessary for multipactor must meet the following criteria:
1. Two parallel surfaces, which can be parallel, are required, this distance between which is adjustable to any length required for multipactor achievement.
2. The structure must be able to operate in the high megahertz to low gigahertz range; due to the small size required for this vacuum sensor, high frequencies must be used to satisfy the multipactor resonant condition.
3. The electric field should be high in the region intended for multipactor, with little electric field elsewhere in the structure, thus a large percentage of the power coupled into the structure can be utilized for the multipactor interaction.

Given these criteria, a re-entrant cavity resonator is suitable to use for this device, but other cavity forms are usable. Other suitable cavity examples would be a short cylindrical $TM_{01}$ cavity, a narrow height $TE_{10}$ rectangular cavity, or a rigid waveguide cavity. Re-entrant cavity gaps provide high electric field strength in the center of the cavity which improve the electron beam interaction with the cavity fields.

A re-entrant cavity can be made by introducing a post into the center of one end of a cylindrical cavity. [FIG. 1 shows a diagram of a cylindrical re-entrant cavity.] $z_0$ is the height of the cavity, $\sigma$ is the gap spacing between the top of the post and the opposite end of the cavity, $P_1$ is the radius of the post, and $P_2$ is the radius of the cavity.

The electric field is concentrated between the post and the opposite end of the cavity, and the magnetic field is concentrated towards the outer cylindrical wall of the cavity. [FIG. 2 demonstrates the fields in the dominant mode of the cylindrical re-entrant cavity.]

The re-entrant cavity can be approximated by a short length of coaxial line that is resonated by the large lumped capacity at the end of the center conductor, this capacity being calculated from the gap spacing and area. At $z=1$, the loop impedance is zero. Summing impedances around the loop gives $$jZ \tan kz_0 + \frac{1}{j\omega C_g} = 0 \qquad (28)$$

$C_g$ is the gap capacitance, neglecting fringing effects, given by $C_g = \epsilon_0 \pi p_1^2/\delta$. Z is the coaxial TEM mode characteristic impedance given by $Z = 138 \log_{10}(p_2/p_1)$. Equation 28 can be rearranged to give an estimate for the resonant wavelength of the cavity.

$$\lambda_0 = 2\pi \left( \frac{Z_0 p_1^2}{2\delta} \ln \frac{p_2}{p_1} \right)^{\frac{1}{2}} \qquad (29)$$

Because this calculation neglects the effect of the fringing capacitance, the resonant wavelength obtained from Eq. 29 is somewhat smaller than the true value.

The unloaded Q of the cavity is given by $$Q_o = \frac{\omega W}{p_d} \qquad (30)$$

where W is the stored energy in the cavity and $\bar{p}_d$ is the time average power dissipated due to wall losses in the cavity. Unloaded Q may be determined by $$Q_o = \frac{1.202 \, nd}{R(a+d)} \qquad (31)$$

where n is the intrinsic impedance of the dielectric, R is the intrinsic wave resistance of the metal walls, d is the height of the cavity, and $\partial$ is its radius.

To adapt Eq. 31 to a re-entrant cavity, two values for the height of the cavity must be used. d in the numerator of Eq. 31 refers to the electric-stored energy of the cavity. Since the electric-stored energy in a re-entrant cavity is in the gap between the post and the opposite wall, the value for $\delta$ can be used in place of d in the numerator of Eq. 31. The variable d in the denominator of Eq. 31 refers to the wall losses in the cavity due to the magnetic field. Because the magnetic field in the dominant mode is concentrated near $\rho_2$, the outer radius of the cavity, the value for $z_0$ will be used in place of d in the denominator of Eq. 31. Making these substitutions into Eq. 31, the unloaded Q of the re-entrant cavity is approximated by $$Q_0 = \frac{1.202 \, n\delta}{R(\rho_2 + z_0)} \qquad (32)$$

The external Q of a cavity is defined by $$Q_{ext} = \frac{\omega W}{p_{ext}} \qquad (33)$$

where $\bar{p}_{ext}$ is the time average power lost due to factors other than wall losses. Power coupled out of a cavity through an aperture is an example of this. In the vacuum sensor presented here, additional power will be lost as heat due to the multipactor discharge on the cavity post surfaces.

The loaded Q of a cavity is defined by $$\frac{1}{Q_L} = \frac{1}{Q_o} + \frac{1}{Q_{ext}} \qquad (34)$$

$$Q_L = \frac{\omega W}{p_L + p_{ext}} \qquad (35)$$

As stated previously, for this device, $p_{ext}$ is the power lost due to multipactor discharge. $p_{ext}$ is given by Eq. 27 to be the product of the average electron current and the impact voltage $$p_{ext} = I_{electron}\,(ave) V_i \qquad (36)$$

Coupling to cavities can be accomplished either capacitively or inductively. Capacitive coupling is best achieved with a probe where the electric field is strong. In this device, that is located in the gap in the center of the cavity. Inductive coupling is best achieved with a loop where the magnetic field is strong. For the re-entrant cavity, this is in the outer ring of the cavity.

IONIZATION OF RESIDUAL GAS MOLECULES

As multipactor is achieved, as described above, an electron current is produced across the re-entrant cavity gap. Collision of the electrons with residual gas molecules, or the probability of ionization occurring in a volume is given by $$\text{Probability} = \frac{\sigma N}{A} \qquad (37)$$

where $\delta$ is the ionization cross section of the gas molecules, N is the total number of molecules in the volume, and A is the area of the volume normal to the path of the electron. Equation 37 is simply the ratio of the total ionization cross-sectional area in a volume to the area of the volume. The number of gas molecules in a volume is determined by the pressure and temperature of the gas, if the gas can be considered to be an "ideal" gas. At low pressures, all gases approach the ideal gas approximation. Since the invention will operate in vacuums higher than $10^{-5}$ torr, the ideal gas law can be used. The ideal gas law is $$n = \frac{PV}{RT} \quad (38)$$

where n is the number of moles of gas in the volume, P is the Pressure of the gas in pascals, R is the universal gas constant given by R=8.314 (j/mol.K), V is the volume in m³, and T is the temperature in Kelvin. By multiplying Eq. 38 by Avogadro's number, an expression for the number of atoms in a volume is obtained, $$N = \frac{PV}{RT} N_A \quad (39)$$

where $N_A$ is Avogadro's number, given by $N_A = 6.022 \times 10^{23}$ (atoms/mol).

The ionization cross section of a molecule is defined as the area which, if struck by an electron, will result in ionization of the molecule. This area is in the plane normal to the path of the incident electron. At low voltage, for example 15 eV, the ionization cross section is very small because only a direct hit on the molecule will result in the complete transfer of energy from the electron to the molecule which is necessary for ionization. As the energy is increased, the ionization cross section increases rapidly because an oblique impact is then sufficient to transfer enough energy for ionization. As the energy is increased further, the ionization cross section goes through a maximum and begins to diminish. The lessening of the ionization cross section at high electron energies can be explained qualitatively by examining the collision process. The molecule can be thought of as a resonant system which is subjected to a pulsed disturbance generated by the passage of the incident electron. The probability that the molecule absorbs enough energy for ionization is dependent on the Fourier component of the pulse which is in resonance with the energy change in the molecule. As the incident electron becomes faster, the width of the pulse narrows, causing the magnitude of the lower frequency components in the pulse to decrease. As a result, the ionization cross section decreases.

The average ion current generated by the interaction of an electron beam with gas molecules is given by the product of the average electron current and the ionization probability (Eq. 37), $$I_{ion(ave)} = I_{electron\,(ave)} \frac{\sigma N}{A} \quad (40)$$

Substituting Eq. 39 into Eq. 40 gives $$I_{ion(ave)} = I_{electron\,(ave)} \frac{\sigma P V N_A}{ART} \quad (41)$$

The mean free path length of the electrons can be neglected in Eq. 41 due to the distance between electrodes being very much smaller than the mean free path length of the electrons at microwave tube pressures.

In summary, utilizing the calculations above for achievement of multipactor, and varying the variables of maximum RF voltage, electrode drive frequency, phase angle, vacuum pressure, and time increment for integration across the electrode gap, the specific and optimal dimensions of this device can be adapted to use in any variety of vacuum tube sensor application.

We claim:

1. An apparatus for testing vacuum levels comprised of a re-entrant cavity resonator within which is located, at both ends of said resonator, a highly capacitive post with capacitive surfaces constructed from material compatible with the type of environment being tested, between said posts there existing a gap; between said posts there being disposed a RF field to obtain a multipactor discharge between said highly capacitive re-entrant cavity post surfaces; and a negatively biased wire, or wires or a grid, disposed between, but not in contact with said post surfaces, for collection of residual gas ions formed by collision with primary electrons produced by said multipactor discharge, thereby producing a measurable electric current which is a function of vacuum pressure.

2. The apparatus of claim 1 in which the re-entrant cavity is cylindrically shaped.

3. The apparatus of claim 1 where the re-entrant cavity achieves the close spaced surfaces with high electric field strengths required for multipactor.

4. The apparatus of claim 1, in which a high peak power RF source is used.

5. The apparatus of claim 1, in which a secondary electron emission enhancing coating is applied to the re-entrant cavity post surfaces.

6. The apparatus of claim 4, in which the apparatus measures the ion current at a specific time after the RF pulse is turned off.

* * * * *